UNITED STATES PATENT OFFICE.

FREDERICK D. S. ROBERTSON, OF TORONTO, ONTARIO, CANADA.

PROCESS OF EXTRACTING POTASSIUM FROM ITS INSOLUBLE COMPOUNDS.

1,317,524.   Specification of Letters Patent.   Patented Sept. 30, 1919.

No Drawing.   Application filed May 17, 1918. Serial No. 235,180.

*To all whom it may concern:*

Be it known that I, FREDERICK DUNCAN STRUAN ROBERTSON, a subject of the King of Great Britain, residing in the city of Toronto, in the Province of Ontario, Canada, have invented certain new and useful Improvements in Processes of Extracting Potassium from Its Insoluble Compounds; and I do hereby declare the following to be a full, clear, and exact description of the invention.

The invention relates to a process of extracting potassium in the form of water-soluble salts from its insoluble compounds, such as feldspar, mica, leucite, glauconite, or green-sands and other forms of potassium containing silicates, flue dusts, etc.

The object of the invention is the extraction and production of the potassic content of such minerals and insoluble compounds in the form of soluble and marketable salts of potassium for manufacturing and agricultural purposes in a rapid and inexpensive manner and by the employment of reagents which are readily obtainable or capable of being easily manufactured adjacent to deposits of such minerals with the use of the minimum amount of heat and with the recovery for re-use of the principal re-acting agent, thus avoiding losses hitherto involved and also the production of an unnecessarily large number of by-products.

In carrying out my process I first grind the feldspar or potassium containing material to be treated to preferably 80 mesh, or even finer, although in many cases it may not be absolutely necessary to reduce it to such a fine state of division, and thoroughly intermix with it a solution of phosphoric acid ($H_3PO_4$) which may be prepared by treating rock phosphate, apatite or phosphorite with sulfuric acid in the ordinary manner.

I prefer to use a phosphoric acid of at least 50% strength and in many cases at least 75%–85% phosphoric acid is preferable, dependent upon the nature of the potassium containing material.

The amount of phosphoric acid should be always slightly, at least, in excess of that required to engage the total alkali metal present in the silicate, for instance, 750 parts by weight of feldspar may be treated with 250 parts of 85% phosphoric acid. Due care must be taken to employ vessels resistant to attack by the reagent, for this purpose the mix can be introduced into tarred-wooden vats or tanks provided with mechanical stirring or agitating arrangements where it is kept in a constant state of agitation and at the same time heated by waste steam or electric coils to the necessary temperature approximately 100° C. to 130° C., when the reaction will be complete in a few hours or less. The soluble constituents are then extracted with hot water, which may be slightly acidified with sulfuric, or other mineral acid, until the insoluble residue of alumina and silica is free from alkali metal (potassium, etc.) and phosphoric acid.

The addition at this point of sulfuric acid is not essential to the process itself but it is at times expedient in that it releases any phosphoric acid which may have combined with the alumina and silica and also prevents any subsequent precipitation of alumina or possible alkaline-earth metal salts during the consequent evaporation of the tank liquors and crystallization of the alkali metal salts. The tank liquors are filtered clear and are sent to vacuum pans or concentrators while the washings are re-used to extract fresh mix in the ordinary manner. Sufficient sulfuric acid is next added to the liquor to engage the total alkali metal content and the liquor is concentrated until all the alkali metal salt crystallizes out as an alkali metal sulfate under a supernatant syrup of phosphoric acid. The potassium sulfate crystals are washed free from adhering phosphoric acid, etc., the washings being returned into the circuit. The syrupy phosphoric acid is utilized in attacking fresh feldspar or other alkali metal containing material.

Instead of sulfuric acid, nitric or hydrochloric acid or any other suitable acid or acid radical may be be used thereby producing a corresponding salt of the alkali metal. The acids are preferably added to the concentrated, or partly concentrated solution, in which case the alkali metal salt of the added acid, or acid radical, will immediately commence to crystallize out leaving the phosphoric acid supernatant. Various changes may be made in the process herein described without, however departing from the general principles of the invention as a whole.

which may be said to consist in the use of phosphoric acid as a reagent and its subsequent recovery and renewed application.

For instance the alkali metal containing mineral after the addition of phosphoric acid may be heated in a suitable furnace to sinter the same and the resulting alkali metal phosphate subsequently extracted by lixiviating the sintered material or the reaction may be carried out at such a temperature that the alkali metal salt is volatilized and subsequently condensed.

In either case the alkali metal phosphate is treated substantially as hereinbefore described.

The following terms used in this specification are herewith defined: "alkali" metal includes potassium and sodium. "Compound" denotes not only chemical compounds but also the mixtures produced by physical means of various elements and chemical compounds; "phosphate acid" any of the acids or acid radicals of phosphorus. "Acid" includes the acid radical of the corresponding acid.

What I claim as my invention is:—

1. The process of producing a soluble salt of an alkali metal, which consists in treating a silicate containing said metal with uncombined phosphoric acid, thereby producing a soluble phosphate of said alkali metal and an insoluble residue consisting only of constituents of the original silicate; separating said alkali metal phosphate from the insoluble residue; adding an acid which will replace the phosphoric acid in the salt thus converting the alkali metal phosphate into the alkali metal salt of the other acid and freeing the phosphoric acid; and crystallizing out the alkali metal salt of the added acid from the phosphoric acid.

2. The process of producing a soluble salt of an alkali metal, which consists in treating a silicate containing said metal with uncombined phosphoric acid, thereby producing a soluble phosphate of said alkali metal and an insoluble residue consisting only of constituents of the original silicate; separating said alkali metal phosphate from the insoluble residue; adding an acid which will replace the phosphoric acid in the salt thus converting the alkali metal phosphate into the alkali metal salt of the other acid and freeing the phosphoric acid; and crystallizing out the alkali metal salt of the added acid from the phosphoric acid and utilizing the recovered phosphoric acid to react upon fresh mineral containing said alkali metal.

3. The process of producing a soluble salt of an alkali metal, which consists in treating a silicate containing said metal with uncombined phosphoric acid at a temperature of approximately 100° C. to 130° C., thereby producing a soluble phosphate of said alkali metal and an insoluble residue consisting only of constituents of the original silicate; separating said alkaline metal phosphate from the insoluble residue; adding an acid which will replace the phosphoric acid in the salt thus converting the alkali metal phosphate into the alkali metal salt of the other acid and freeing the phosphoric acid; and crystallizing out the alkali metal salt of the added acid from the phosphoric acid.

4. The process of producing a soluble salt of an alkali metal, which consists in treating a silicate containing said metal with uncombined phosphoric acid, thereby producing a soluble phosphate of said alkali metal and an insoluble residue consisting only of constituents of the original silicate; decanting the liquid and leaching the insoluble residue with acidulated water; adding to the liquid an acid which will replace the phosphoric acid in the salt thus converting the alkali metal phosphate into the alkali metal salt of the other acid and freeing the phosphoric acid; and crystallizing out the alkali metal salt of the added acid from the phosphoric acid.

5. The process of producing a soluble salt of an alkali metal, which consists in treating a silicate containing said metal with uncombined phosphoric acid, thereby producing a soluble phosphate of said alkali metal and an insoluble residue consisting only of constituents of the original silicate; decanting the liquid and leaching the insoluble residue with hot water acidulated with sulfuric acid; adding to the liquid sulfuric acid which will replace the phosphoric acid in the salt thus converting the alkali metal phosphate into the alkali metal salt of the other acid and freeing the phosphoric acid; and crystallizing out the alkali metal salt of the added acid from the phosphoric acid.

6. The process of treating an insoluble ore containing an alkali metal which consists in treating the ore with uncombined phosphoric acid, thereby producing a soluble phosphate of said alkali metal and an insoluble residue consisting only of constituents of the original silicate; and finally replacing the phosphoric acid of the alkali metal salt by some other acid and recovering the phosphoric acid.

Signed at Toronto this 15th day of May, 1918.

FREDERICK D. S. ROBERTSON.